US005483602A

United States Patent [19]

Stenzel et al.

[11] Patent Number: 5,483,602

[45] Date of Patent: Jan. 9, 1996

[54] METHOD AND APPARATUS FOR DETECTING PRINTED IMAGES ON DOCUMENTS BY TESTING FOR THE PRESENCE IN THE IMAGES OF STRUCTURAL ELEMENTS HAVING DEFINED REGULARITIES WHICH ARE RECOGNIZABLE BY THE EYE AND COMMON TO A VARIETY OF DOCUMENTS

[75] Inventors: Gerhard Stenzel, Germering; Wittich Kaule, Emmering, both of Germany

[73] Assignee: GAO Gesellschaft für Automation und Organisation mbH, Germany

[21] Appl. No.: 109,446

[22] Filed: Aug. 20, 1993

[30] Foreign Application Priority Data

Aug. 20, 1992 [DE] Germany .......................... 42 27 613.6

[51] Int. Cl.$^{6}$ ...................................................... G06K 9/00

[52] U.S. Cl. .......................... 382/135; 382/317; 194/328

[58] Field of Search .................................. 382/7, 19, 25, 382/28, 61, 135, 137, 195, 203, 206, 317; 283/72, 85, 114; 194/202, 302, 328; 348/150, 161; 209/534

[56] References Cited

U.S. PATENT DOCUMENTS

| | | | |
|---|---|---|---|
| 4,349,111 | 9/1982 | Shah et al. | 209/534 |
| 4,723,149 | 2/1988 | Harada | 355/14 R |
| 4,837,840 | 6/1989 | Goldman | 382/7 |
| 4,881,268 | 11/1989 | Uchida et al. | 382/7 |
| 5,216,724 | 6/1993 | Suzuki et al. | 382/7 |
| 5,257,119 | 10/1993 | Funada et al. | 358/438 |
| 5,321,470 | 6/1994 | Hasuo et al. | 355/201 |

FOREIGN PATENT DOCUMENTS

| | | | |
|---|---|---|---|
| 2045732 | 12/1992 | Canada | 382/7 |

*Primary Examiner*—Jose L. Couso
*Assistant Examiner*—Andrew W. Johns
*Attorney, Agent, or Firm*—Bacon & Thomas

[57] ABSTRACT

In order to detect security documents irrespective of their individual graphic designs, a method and apparatus are provided in which the presence of certain structural elements common to a variety of different security documents are analyzed without analyzing the whole printed image or comparing it for identity with the stored printed image. For example, the structural elements may be curved colored lines present in a certain minimum density of a surface, or intertwined line structures known as guilloches. The document to be copied is scanned as in any normal copying operation and the structural elements identified by electronic pattern recognition in order to determine whether copying is to be permitted, without requiring additional detection elements.

12 Claims, 1 Drawing Sheet

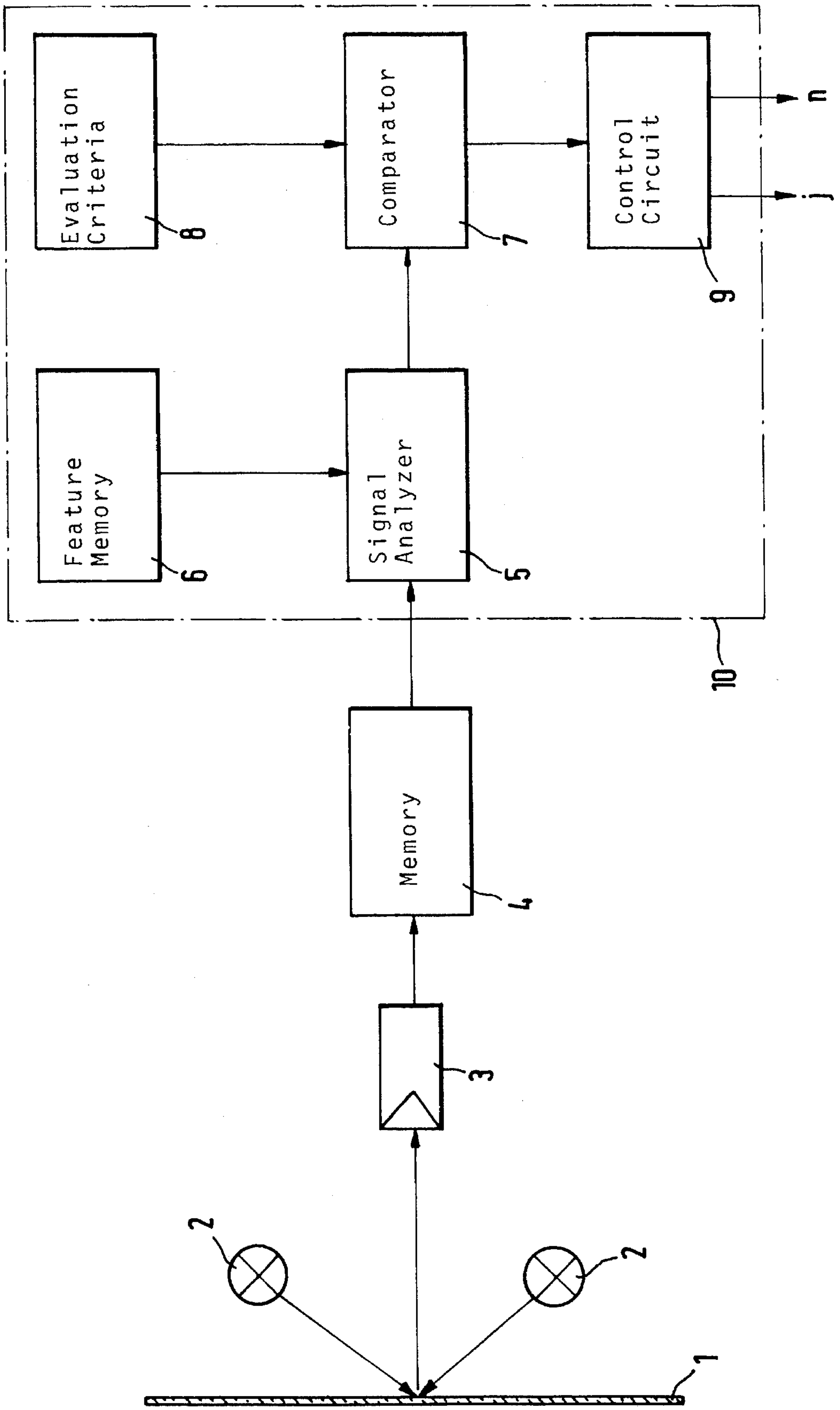
Evaluation Criteria
8
Comparator
7
Control Circuit
9
n
j
Feature Memory
6
Signal Analyzer
5
10
Memory
4
3
2
2
1

METHOD AND APPARATUS FOR DETECTING PRINTED IMAGES ON DOCUMENTS BY TESTING FOR THE PRESENCE IN THE IMAGES OF STRUCTURAL ELEMENTS HAVING DEFINED REGULARITIES WHICH ARE RECOGNIZABLE BY THE EYE AND COMMON TO A VARIETY OF DOCUMENTS

The present invention relates to a method for detecting documents, papers of value, bank notes or the like whereby the printed images of the documents to be tested are electronically scanned in their totality or in certain areas and compared with reference values and specific measures are initiated if given criteria are present, and to an apparatus for carrying out the method.

In many technical areas it is necessary to detect documents to be able to initiate specific measures in accordance with this information. With respect to the detection of papers of value, bank notes and the like the field of color copiers is currently of particular importance since such documents are increasingly imitated or duplicated with color copiers. To prevent such activities it would be desirable for example to have such documents detected as soon as they are inserted as masters into a color copier in order to prevent the following copying operation.

A number of proposals have been made for carrying out such measures, some aiming at detecting special features provided in the security document or using the presence of such features as a criterion for aborting the copying operation.

Such an apparatus is described for example in U.S. Pat. No. 4,723,149. Along with the sensor means necessary for the customary mode of functioning this copying apparatus has an additional magnetic sensor for detecting magnetic features present on the original. If magnetic features are detected this is equated with the presence of a security document. In this case a control signal is triggered which prevents the following copying operation.

A similar apparatus which likewise aims at providing the bank note with special features is known from IBM Technical Disclosure Bulletin, Vol. 18, No. 3. The confidential document is printed with at least one color having a strong absorption line in a narrow spectral range. The copier contains three detectors that have a narrow spectral sensitivity in red, green or blue. When the document is illuminated with a light source usually provided in copiers the detectors measure the light quantity reflected by the document in the particular spectral range. If a signal value from one detector is below the values of the other two due to the absorption by the colorant this is a sign that a confidential document is to be copied. In this case the copying operation is likewise aborted.

Although such a procedure would basically solve the abovementioned problem it has some disadvantages which ultimately rule out the use of such apparatus. All apparatus designed to detect special and possibly additional features of the documents to be protected, such as magnetism, absorption behavior, fluorescence, etc., have the disadvantage that they fail when the feature properties are neutralized or completely omitted in the master. In the simplest case this can be done by using a photograph. Since the photograph of the original normally no longer has the authenticity features it is not recognized by the detection unit of the copying machine so that it is cleared as an unprotected document for the copying operation.

The same result is obtained if the additional measuring means are manipulated or disabled.

Another way of preventing the copying of confidential documents is shown by EP-A 0 342 060. In this example the image data of the original are digitized and stored temporarily. In accordance with a comparison with reference values likewise stored in the copying machine the copying operation is prevented or cleared. In the present case the document to be protected is thus not detected with reference to a defined physical property, as described at the outset, but with reference to the individual image content.

Although this method prevents manipulation of the type described at the outset it has the disadvantage that it is very elaborate and requires a lot of storage space since the printed images of all documents to be detected must be stored electronically as reference values. Irrespective of the high electronic effort only the currently stored documents can be detected. Such a method accordingly makes it necessary to update the data constantly so that the required memory constantly grows. Comparing each document to be copied with all reference values of course considerably slows down the copying rate, which clearly opposes the desire for short copying times.

Assuming this prior art the invention is based on the problem of providing a method for detecting security documents which makes it easily possible to detect a great number of security documents irrespective of their individual graphic design, and of stating an apparatus for carrying out the method.

The solution to this problem is found in the independent claims. The subclaims involve developments of the inventive solutions.

The basic idea of the invention is the finding that the printed images of security documents usually contain individual structural elements that are characteristic of papers of value. These structural elements that are already present or to be provided in newly designed papers of value permit a general classification, i.e. one can already deduce the existence of a paper of value if such structural elements are present without analyzing the whole printed image or comparing it for identity with a stored printed image. In the simplest case these structural elements are curved colored lines present in a certain minimum density by surface. One normally evaluates the intertwined line structures known in the paper-of-value sector, so-called guilloches.

Structural elements should always be selected that have a certain regularity and are representative of a great number of papers of value or that are characteristic of a great number of papers of value.

In the concrete case of application the color copier is provided with an electronic unit which permits comparison between the currently scanned document and the stored regular data using corresponding comparing programs. If this defined regularity is found on the master the copying operation is interrupted or not started at all.

The inventive method has the advantage that security documents are detected using a general feature common to security documents that results from the printed image itself and is therefore still present on a photograph but does not impair the individual design of the documents to be protected. The individual printed image results from the color design and arrangement of the structural elements.

Furthermore no additional measuring means are necessary that could be disabled or evaded since the master is scanned as in any normal copying operation and the structural elements identified by electronic pattern recognition.

A further advantage is that few reference values need be stored while a great number of different security documents can be detected and protected from unauthorized copying.

In a preferred embodiment the structural elements are guilloches. These looped line patterns are printed in soft colors over large parts of the bank notes of a great variety of currencies and their various denominations. But most papers of value also have guilloches. Two patterns in different colors are usually artistically interwoven. When the image of such a bank note is broken down into pixels with the aid of a color scanner it is relatively simple to identify the lines and their colors. For example guilloches can be detected using the mean distance between lines in one of the colors, the ratio of mean distances between lines in both colors or the distribution function of the distance between lines as parameters or defined regularities.

Other structural elements can of course also be used. It is particularly convenient to analyze e.g. special rotationally symmetrical figures or printed images containing special color combinations that are chiefly used in security printing, etc.

Further embodiments and their advantages shall be explained in more detail in the following with reference to the Figure showing the functional diagram of a possible embodiment of the inventive apparatus for detecting security documents.

Document 1 can be a paper of value, bank note or the like. Document 1 has a printed image comprising, at least in certain areas, individual structural elements that follow a defined regularity. Examples of such structural elements and their regularities are explained in more detail elsewhere.

Document 1 is illuminated by two light sources 2. The reflected light is registered by detector 3 and converted completely or partly into a digital data record which is filed in intermediate memory 4. Signal analyzer 5 processes these data using known mathematical pattern recognition methods with consideration of the structural elements stored in feature memory 6. The result of this test is for example a numerical value stating how often or at what density per unit of area the given structures are present in the printed image of document 1. This numerical value is fed to comparator 7 which ascertains whether the structural elements determined by analyzer 5 correspond to the values given in evaluation memory 8. Ranges of tolerance, upper or lower limiting values, set values or the like can be defined in the evaluation memory for example. If these criteria are met the further processing or treatment of document 1 is prevented as explained above.

Modules 5 to 9 form an electronic evaluation and control unit 10 which can of course have a much more compact structure than shown schematically in the Figure for reasons of clarity.

Processing unit 10 can be built into any apparatus in which it is necessary to detect documents having printed images with characteristic structures. Preferred apparatus, however, are copying machines, printing devices and bank note testing devices.

Processing unit 10 is normally inserted in series in the data processing path of the copier. This ensures that all data to be copied are tested for agreement with the given structural elements.

In copying machines repeated testing of the same original can be avoided in the "multiple copy" mode if it is definitely impossible or pointless to replace the original during preparation of the multiple copies. This is ensured if the master is firmly fixed during the copying operation or if the initially prepared data (tested for reliability) are used for all identical copies after the multiple copies are initiated. In this way the second and following duplicates can be prepared at the copying machine's own copying rate. There is no delay in the operation due to the allowability test in such cases.

It is of course also possible to relay the scanned signals to the electrophotographic unit during the test so that the copying operation is interrupted when a protected document is detected.

As already mentioned unit 10 can also be used advantageously in printers, in particular in view of the developments in the area of multimedia systems. These systems will increasingly make it possible in future to reproduce the image from any recording means, e.g. a photo-camera or video camera, or from television sets. It is therefore important to prevent duplication of security documents in this area as well. The recording of the printed image of a security document can hardly be prevented but the printout can be avoided by inventive unit 10. Before the printer converts the image data and outputs them on a printing medium they are tested for the presence of structural elements with a certain regularity and treated as described above.

In all abovementioned areas of application the inventive method and corresponding apparatus have the advantage that a document can be detected easily and relatively fast. No additional sensors are necessary. This has the further advantage that no special constructional changes need be performed on those apparatus containing processing unit 10 according to the invention since electronic processing unit 10 can be placed anywhere one pleases in the particular apparatus.

Some examples of structural elements and their regularities that can be used in the inventive method shall now be stated. For papers of value such regularities can also be taken from the so-called Stock-Exchange Guidelines (Common Principles of German Stock Exchanges for Printing of Papers of Value) which lay down the formal conditions to be heeded for producing papers of value. The following list is not exhaustive, i.e. other structural elements can also be used that have a readily testable regularity.

A structural element already present very frequently on security documents is the guilloche. Guilloches are delicate protective line systems intwined according to certain geometrical laws that are monochrome or polychrome and produced on special geometrical lathes. Guilloches can exist as positive or negative guilloches. They are produced by letterpress printing or line intaglio printing combined with letterpress printing.

Evaluation factors for these guilloches can be for example the mean distance between lines in the first color, the characteristic course of lines, line structure (line width), surface area or surface arrangement, line density, the number of intwinements and/or crossing points of lines per unit of area, the mean distance between lines of different colors, the ratio of mean distances between lines in both colors or distribution function (histogram), contour sharpness in relation to line width, sharpness of intwining and crossing points in relation to line width, etc.

Other line structures can of course also be used, such as parallel lines or line networks, if it is certain that the evaluated regularities do not, or hardly, exist in "normal" masters in the defined form, combination or surface distribution.

There is of course no reason to limit the structural elements to linear structures. One can also use other geometrical figures or structures, such as triangles, quadrangles, circles, star-shaped structures, symbolic figures or any combinations of these figures.

Rotationally symmetrical figures are particularly suitable for pattern recognition.

The regularity evaluable in these cases can for example also be the number of elements per unit of area, the mean distance between these elements or the distribution of elements throughout the document.

In connection with the abovementioned structural elements the color can be considered as an additional criterion since very special shades of color used only by authorized printing houses are frequently selected for papers of value, bank notes and the like. Interwoven characters are also frequently printed in different shades of color like the above-described guilloches so that the analogous regularities can be used for evaluation in this case.

When the regularities of existing documents are determined the problem can arise that several regularities are present but none is measurable or classifiable with complete unambiguity per se. In these cases it can be helpful to test and evaluate the presence of several regularities. To increase the reliability of detection one can give individual characteristics different weights so that detection is signaled if a given minimum number of points exists. Similarly, the presence of a given number of properties or structures from a larger amount to be chosen from can also lead to the desired evaluation result. The combination or weighting of different regularities would thus be an additional criterion for evaluation.

If the regularities to be evaluated are already considered when a corresponding document is designed the individual structures and properties can be selected and designed more expediently. In these cases relatively few separate properties are generally required since they can be detected quite reliably and enter into the evaluation via the abovementioned weighting with high detection values.

We claim:

1. A method of testing documents to determine whether the documents belong to a predetermined class of documents, comprising the steps of:

optically scanning the documents to be tested to obtain scanned printed images, and initiating specific measures if given criteria are present without identifying the specific type of document; and comparing the scanned images with reference values to determine whether background structural elements are present in the scanned image, said background structural elements having defined regularities recognizable by the eye and common to each type of document in said predetermined class without identifying a specific type of document;

wherein the specific measures are initiated if said background structural elements are determined to be present.

2. A method as claimed in claim 1, further comprising the steps of storing the scanned printed images temporarily so that they may be tested using said comparison step prior to initiating said specific measures, and according different weights to structural elements having different regularities.

3. A method as claimed in claim 2, wherein the temporarily stored images are tested for linear structural elements having different colors.

4. A method as claimed in claim 3, wherein the linear structural elements are selected from the group consisting of guilloches, line networks and parallel lines.

5. A method as claimed in claim 3, wherein the defined regularity tested is selected from the group consisting of the frequency of intersection of lines in the structural element, the distribution function of distance between the lines, and the ratio of mean distances between lines of two colors.

6. A method as claimed in claim 2, wherein the temporarily stored data is tested for rotationally symmetrical or symbolic figures.

7. A method as claimed in claim 6, wherein the defined regularity tested is selected from the group consisting of a number of structural elements per unit of area and the distribution of structural elements throughout the document.

8. A method as claimed in claim 2, wherein the simultaneous presence of several regularities is tested and the existence of regularities assumed for evaluation of the printed image.

9. Apparatus for testing documents to determine whether the documents belong to a predetermined class of documents, comprising:

means for temporarily storing scanned printed images of the documents to be tested;

means for performing a comparison of the temporarily stored data with reference values to determine whether background structural elements are present in the scanned image, said background structural elements having defined regularities recognizable by the eye and common to each type of document in said predetermined class without identifying the specific document; and control means for initiating specific measures if said background structural elements are detected, without identifying the specific type of document.

10. Apparatus as claimed in claim 9, wherein the control means includes a signal analyzer for detecting said structural elements and an evaluation memory in which evaluation criteria are stored, and further comprising a comparator for determining whether the detected structural elements correspond to values stored in the evaluation memory.

11. Apparatus as claimed in claim 9, wherein the means for temporarily storing the scanned data is an intermediate memory.

12. Apparatus as claimed in claim 9, wherein the apparatus is used in a machine selected from the group consisting of a copying machine, bank note testing device, or printing device.

* * * * *